US008532561B2

(12) United States Patent
Hook et al.

(10) Patent No.: US 8,532,561 B2
(45) Date of Patent: Sep. 10, 2013

(54) VIRTUAL TRAINING SYSTEM

(75) Inventors: Jacqueline A. Hook, Redondo Beach, CA (US); Barbara L. Schadlow, Los Angeles, CA (US); Kathleen A. Winberry, Long Beach, CA (US)

(73) Assignee: Laureate Education, Inc., Baltimore, MD (US)

( * ) Notice: Subject to any disclaimer, the term of this patent is extended or adjusted under 35 U.S.C. 154(b) by 1157 days.

(21) Appl. No.: 11/902,606

(22) Filed: Sep. 24, 2007

(65) Prior Publication Data

US 2008/0075418 A1    Mar. 27, 2008

Related U.S. Application Data

(60) Provisional application No. 60/846,335, filed on Sep. 22, 2006.

(51) Int. Cl.
*G09B 5/00* (2006.01)

(52) U.S. Cl.
USPC ......... 434/307 R; 434/219; 434/323; 434/345

(58) Field of Classification Search
USPC ............ 434/307 R, 323, 326, 353, 345, 619; 705/300, 301
See application file for complete search history.

(56) References Cited

U.S. PATENT DOCUMENTS

| | | | |
|---|---|---|---|
| 4,178,698 A | 12/1979 | Cornell | |
| 5,295,836 A * | 3/1994 | Ryu et al. | 434/335 |
| 5,433,614 A | 7/1995 | Beye | |
| 5,454,722 A | 10/1995 | Holland et al. | |
| 5,513,991 A | 5/1996 | Reynolds et al. | |
| 5,601,436 A * | 2/1997 | Sudman et al. | 434/350 |
| 5,823,786 A * | 10/1998 | Easterbrook | 434/247 |
| 5,890,906 A | 4/1999 | Macri et al. | |
| 6,099,320 A | 8/2000 | Papadopoulos | |
| 6,282,404 B1 * | 8/2001 | Linton | 434/350 |
| 6,311,041 B1 | 10/2001 | Goodyear | |
| 6,496,681 B1 | 12/2002 | Linton | |
| 6,501,937 B1 * | 12/2002 | Ho et al. | 434/362 |
| 6,595,781 B2 * | 7/2003 | Sutton | 434/276 |
| 6,705,869 B2 * | 3/2004 | Schwartz | 434/219 |
| 6,736,642 B2 * | 5/2004 | Bajer et al. | 434/236 |
| 6,755,659 B2 | 6/2004 | Losasso et al. | |
| 6,904,263 B2 | 6/2005 | Grudnitski et al. | |

(Continued)

*Primary Examiner* — Robert J Utama
*Assistant Examiner* — Sadaruz Zaman
(74) *Attorney, Agent, or Firm* — Venable LLP; Michael A. Sartori; Todd R. Farnsworth

(57) ABSTRACT

A method and kit for training a participant in professional practice. The method may include video recording a first session of a master practitioner interacting with clients in a professional environment, video recording a second session of an interviewer viewing the first session and interacting with the master practitioner about what transpired in the first session, preparing a video segment comprising video footage from the video recording of the first session and the video recording of the second session, and providing the video segment to the participant. The kit may include a video segment, the video segment comprising video footage from the first video recording of the first session and the second video recording of the second session. The kit may further include an assignment instruction document corresponding to the video segment, a session outline document corresponding to the first session, an analysis document for use when the participant views the video segment, and a rubric document for guidance of the participant in preparing a written assignment about the first session. The rubric document may also be used by an assessor in evaluating the participant's written assignment based on the video segment.

22 Claims, 17 Drawing Sheets

(56) References Cited

U.S. PATENT DOCUMENTS

| | | | |
|---|---|---|---|
| 7,280,991 B1 * | 10/2007 | Beams et al. | 706/46 |
| RE39,942 E * | 12/2007 | Fai et al. | 434/350 |
| 7,823,056 B1 * | 10/2010 | Davey et al. | 715/202 |
| 2004/0018478 A1 * | 1/2004 | Styles | 434/350 |
| 2004/0234934 A1 | 11/2004 | Shin et al. | |
| 2005/0170320 A1 | 8/2005 | Powell | |
| 2005/0221268 A1 | 10/2005 | Chaar et al. | |
| 2005/0239022 A1 | 10/2005 | Harless et al. | |
| 2005/0239035 A1 | 10/2005 | Harless et al. | |
| 2006/0064643 A1 * | 3/2006 | Hariton | 715/751 |

\* cited by examiner

Week 10: Virtual Field Experience™ Assignment

 Introduction ← 201

Throughout your early childhood education studies, you will engage in field experiences in your local community, where you will observe and conduct classroom lessons and activities. To give you a more well-rounded and diverse set of experiences, Kendall College has provided the Virtual Field Experience (VFE™). You will view videos of learning environments in many different demographic and geographic settings, age/grade levels and subject areas. In each VFE™, you will have an opportunity to examine classroom lessons and materials, observe the lesson implementation, analyze teaching effectiveness and its impact on student learning, and use professional language to share your analyses. As you progress through your course work, and continue your development as a teacher, you will respond to these experiences with a greater depth of knowledge and insights.

The VFE™ for this course features a math lesson that was videotaped in a second-grade classroom. This week, you will examine background materials on this lesson, view the video and write a thoughtful analysis based on your current level of teacher development.

 Learning Objectives 202

Students will:

- Observe and analyze a classroom lesson for effective teaching and learning practices
- Share insights gained from authentic professional dialogue about teacher thinking, reflection, and decision making
- Evaluate and provide evidence of the effectivness classroom management techniques and strategies
- Examine and demonstrate their professional growth and development through analysis and evaluation of another teacher's performance
- Use effective written communication skills ---
| Please proceed to the VFE™ Assigment. ← 203 |

Virtual Field Experience™ Assignment

This VFE™ Assignment is designed to promote your development as an early childhood educator. In this assignment, you will observe a classroom lesson and listen to professional dialogue about what took place during the lesson and the reasoning behind the teacher's actions and decisions. You will have an opportunity to demonstrate your ability to identify, analyze, and evaluate teaching practices and learning processes using professional language. As you proceed through your studies—expanding your knowledge and professional vocabulary, you will bring greater insights to each new VFE™ Assignment and thus demonstrate your growth and development as a teaching professional. /204

Follow the instructions below to complete this VFE™ Assignment.

1. Review the VFE™ Video Documents. Click on the links below to access the documents that will help you prepare to view the VFE™ video. Familiarize yourself with the VFE™ Lesson Plan. Also, preview the VFE™ Video Analysis Sheet, which you will complete while viewing the video.

Click here for the VFE™ Lesson Plan (in MS Word format)

Click here for the VFE™ Video Analysis Sheet (in MS Word format)   ←—205

2. View the VFE™ Video and Complete the VFE™ Video Analysis Sheet. View the video in its entirety. While viewing, consider the contextual factors and lesson plan upon which this teaching-and-learning scenario was based. It is strongly recommended that you stop the video as necessary to fill in the VFE™ Analysis Sheet as instructed below. The analysis sheet is NOT to be submitted. It is intended to help you gather and organize your thoughts as you view the video. /206

Complete the VFE™ Video Analysis Sheet as follows:

a. Look for evidence in the video of the competencies and practices listed in the first column of the Analysis Sheet. Consider how each competency/practice relates to the contextual factors and lesson plan for this teaching scenario.

b. Make notes in the second column about what you heard or observed in the video that provides evidence of the competencies and practices and their effectiveness in this particular lesson with this particular class of students. Pay attention to what the teacher says about the thinking and rationale for instructional planning and decision-making.

c. Jot down comments, questions, and reactions about the competencies and practices evident in the video—noting strengths and weakness in the lesson, making connections with educational research and theory, and making suggestions for improvement.

3. Write an analysis of the VFE™ Assessment Video. Select at least three of the competencies/practices listed in the first column of the VFE™ Video Analysis Sheet. Based on the notes you took while viewing the video, write an analysis that focuses on these areas. Use writing skills and educational terminology and that demonstrate your professional growth and learning. Use the criteria provided in the VFE™ Assignment Rubric (provided below) to guide your writing. (Assignment length: 2 pages) /207

VFE™ Assignment Rubric (in MS Word format)

Include the following in your analysis:

a. Explain and give examples of how the video demonstrated effective application of each of the competencies/practices. /208 b. With regard to each competency/practice you selected, share insights you gained from the dialogue between the two educators that you may not have gained from observation alone.

c. Comment on the teacher's effectiveness in organizing, managing, and building a sense of community in the learning environment. Provide evidence to support your response.

d. Based on your current level of knowledge and skill, indicate one or more recommendations for improvement that you would make to this teacher.

---

When complete, save your VFE™ Assignment in one MS Word file as VFE+your first initial+last name. For example, the file name of Sue James's assignment would be "VFESJames.doc"

Submit this assignment via the Dropbox. Click the Submit an Assignment link, choose the Module 6: VFE Assignment Dropbox basket, then add your assignment as an attachment.

Final Notes About Professional Development:

*Ongoing professional development:* As you continue your coursework, engage in field experiences, collaborate with colleagues, and keep abreast of current issues in early childhood education, you will continue to reflect on your learning and expand your knowledge and skills. As a professional, take the initiative to periodically reassess your growth and learning, and set new goals for continued professional development.

*Communication Skills:* Communication skills, both oral and written, are essential to your success as a teaching professional. To ensure success in your coursework, field experience, and teaching career, make the commitment to demonstrate high-quality written and oral communication skills. Refer to the Supplemental Readings and Resources as well as other resources for guidance in writing and editing your communications and assignments, and improving your oral communication skills.

Mountain Math Mini-Lesson

Note: The structure of the teacher's original lesson plan was adapted to fit the Kendall Lesson Plan Format. This lesson plan highlights only the concepts addressed in the Virtual Field Experience™ video.

Teacher: JANE DOE

Date: January 18th

Age Range/Grade Level: Gr. 2

Lesson/Activity Duration: 30 min., 1x/wk*

*Note: Students in Ms. Rawlins' class receive an hour of math instruction every day. The "Mountain Math" mini-lesson is a 30-minute supplemental math review that occurs once each week.

Subject Area: Mathematics

Curricular Unit/Theme: Math Concepts Review

State Standards: NCTM

Process:
- Apply and adapt a variety of appropriate strategies to solve mathematical problems
- Communicate mathematical thinking coherently and clearly to peers, teachers, and others Content:
- Identify ordinals and the positions they represent within a number sequence
- Develop and use strategies for whole-number computations, with a focus on addition and subtraction
- Recognize, name, build, draw, compare, and sort two- and three-dimensional shapes

Learning Objectives:

Review the following skills and related concepts:
- Solve inequalities
- Read left-to-right to describe the solution to an inequality
- Use symbols to describe the solution to an inequality
- Add three-digit numbers
- Match an image of a three-dimensional shape with its solid three-dimensional form
- Define ordinal
- Differentiate between number names and ordinals

Academic Vocabulary to Be Taught:

compare, concept, contrast, define, reflect, respect, solve, strategy, volunteer

Content Vocabulary to Be Taught:

add, cone, cylinder, cube, digits, equals, greater than, less than, ones/tens/hundreds place, ordinal, solid shape (geometric solid), sphere

FIG. 6A

Materials:
- Math Concepts Review Sheet
- Bulletin board with mounted pockets
- Flip chart
- Construction paper
- Markers
- Scissors
- Optional: Manipulatives (Cuisinaire rods, geometric solids)

Grouping Structures:
- Individual Work
- Peer Tutoring
- Whole Group

Lesson/Activity Sequence:

FIG. 6B

| Beginning—Introduction/Anticipatory Set: 10 minutes ||
|---|---|
| Teacher Actions | Learner Actions |
| • Introduce "Mountain Math" as an activity where students climb the "math mountain" together<br>• Provide each student with an activity page containing 22 problems on previously learned topics<br>• Circulate during the students' work period to help struggling individuals and facilitate peer tutoring<br>• Create a collaborative, inquiry-centered classroom culture, model positive approaches to learning new concepts and solving challenging problems, and emphasize that getting the wrong answer is part of the process, and inherently okay<br>• Model supportive language and collaborative practices | • Work individually, with peers, and/or with the teacher to solve the problems and write the solutions<br>• Approach and work through the problems with a positive, can-do attitude<br>• Use supportive language when working with their peers |
| Middle—Methods/Strategies: 15 minutes ||
| Teacher Actions | Learner Actions |
| • Reassemble the whole group when all students have solved the problems<br>• Review each problem and "ask" the group for suggestions about how to solve it<br>• Scaffold the students' responses to guide them through a breakdown of each problem's concepts and process<br>• Support and encourage students in sharing their thoughts and ideas and explaining concepts from their individual perspectives<br>• Scaffold the students' responses to revisit and confirm problem-solving strategies | • Read aloud the math problems individually and/or as a group<br>• Answer some questions individually, some as a group<br>• For new or challenging concepts, individual students may volunteer to work through a problem on the flip chart with step-by-step support or coaching from the group (and teacher)<br>• Represent their solutions physically (i.e., using their hands to shape inequality symbols), verbally, or in writing on the class flip chart<br>• Correct their solutions with a differently-colored pencil |
| End—Synthesis/Closure: 5 minutes ||
| Teacher Actions | Learner Actions |
| • Have the students to turn in their papers<br>• Ask the students what questions, ideas, or examples they have in relation to specific concepts<br>• Emphasize that they are "taking steps up the mountain", and, like real mountain climbers, they are making their progress together<br>• Confirm with the students that they will revisit this activity in one week | • Turn in their problem sets<br>• Share questions, ideas, or examples they have in relation to specific concepts<br>• Comment on the process of team or collaborative learning |

Sample Questions:

1. Circle the correct symbol.

820 > = < 823

2. Find the sum.

327 + 340

3. Circle the name of this shape.

cone  cylinder  cube  sphere

4. When we count things by their place or position, the numbers we use are called:

_____

5. Which ordinal describes the number four's place in line?

first  second  third  fourth  fifth

Assessment:
- At the beginning of the year, all students will take a benchmark assessment to inform the teacher of students' individual strengths and challenges
- During the lesson, help individual students and note their challenge areas
- At the end of the lesson, review each student's activity page and note areas of both progress and improvement

| VFE™ Video Analysis Sheet | | |
|---|---|---|
| Competencies/Practices<br>What I looked for. | Evidence<br><br>What I heard or observed. | Analysis<br><br>My comments, questions, and reactions. |
| Knowledge of Subject Matter | | |
| Preparation and Accessibility of Materials | | |
| Attention to Learning Objectives and Standards | | |
| Developmentally Appropriate Practices | | |
| Instructional Methods and Strategies | | |
| Differentiating Instruction to Meet Diverse Learning Needs | | |
| Strategies for English Language Learners | | |
| Strategies for Students with Special Needs | | |

FIG. 7A

| VFE™ Video Analysis Sheet | | |
|---|---|---|
| | | |
| Informal Assessment | | |
| Classroom and Behavior Management | | |
| Student Engagement and Active Learning | | |
| Responsiveness to Students' Cultures and Issues of Diversity | | |

| VFE™ Assignment Rubric | | Meets Standard | |
|---|---|---|---|
| Analysis Component | Standard | Yes | No |
| Explanation of Effective Application of Teaching Competencies/Practices | Clear explanations are given for how each of the three teaching competencies/practices was effectively applied during the lesson. | | |
| | Appropriate examples were given for each explanation. | | |
| Insights Gained from Professional Dialogue | With regard to each competency/practice you selected, share insights you gained from the dialogue between the two educators that you may not have gained from observation alone. | | |
| | Insights are indicated for three teaching competencies/practices. | | |
| | Insights are clearly stated and are pertinent to the dialogue contained in the video. | | |
| Comments on Effectiveness of Classroom Management | Comments are clearly stated and they relate to research-based concepts or techniques for effectively organizing, managing, and building a sense of community in the learning environment. | | |
| | Supporting evidence is provided and clearly stated. | | |
| Recommendations for Improvement | One or more recommendations are clearly stated. | | |
| | The recommendations reflect knowledge of effective educational practices. | | |
| Writing Proficiency | Writing is coherent and logical. | | |
| | Effective grammar and sentence/paragraph construction is present. | | |
| | There are no more than five errors total in spelling, capitalization and punctuation. | | |

VIRTUAL TRAINING SYSTEM

CROSS REFERENCE TO RELATED APPLICATIONS

This application is related to and claims the priority benefit of U.S. Provisional Patent Application No. 60/846,335, filed Sep. 22, 2006, entitled "Virtual Training System," the entirety of which is hereby incorporated by reference.

BACKGROUND

1. Field of Invention

The invention relates generally to methods and kits for professional development and training of participants, more particularly, to methods and kits for professional development and training which incorporate video segments and written materials to provide virtual field experiences to participants to accelerate professional development.

2. Related Art

Traditionally, in many professional fields, instruction and development of participants, for example, novice participants, often requires the participants to view master practitioners in action. By doing so, the participants can observe the practical use of theoretical and/or academic techniques by master practitioners in the relevant field. For example, in the educational training field, in particular the professional development of elementary, middle-level, and secondary school teachers and teachers-in-training, actual field observation of master teachers is typically a requisite part of the curriculum for many certified teacher training programs.

Notwithstanding the obvious benefits to participants that result from such observation, live field experiences still have several drawbacks. For example, the physical presence aspect can be disadvantageous and inconvenient to a participant due to the fact that the participant must travel to and from a particular setting to observe the master practitioner in person. Furthermore, the participant may be limited in terms of access to diverse field experiences encompassing, for example, different environments or settings, diverse student demographics, varying subject matter or content area, and/or different master practitioners. Even more, the presence of the participant may sometimes remove some of the authenticity of the field experience based on the fact that the master practitioner and/or others may be distracted because of the presence of the participant. Moreover, the participant may be a novice in the relevant professional field and, accordingly, is generally unable to see and understand professional techniques being used by a master practitioner. A novice participant also typically lacks the professional vocabulary and know-how to discuss what he/she has seen during the field experience. Also, even when a participant observing a master practitioner in a field experience is able to pick up on the practical application of some theoretical techniques, much of the master practitioner's methods and applications of essential principles can often be lost because the participant is unable to "get into the head" of the master practitioner during the field experience.

What is needed then are improved and more readily available methods and materials to accelerate professional development of participants in a given field while also increasing the participants' depth and breadth of understanding in the given field.

SUMMARY

In one exemplary embodiment of the invention, a method for training a participant in professional practice is provided. The method may include video recording a first session of a master practitioner interacting with clients in a professional environment, video recording a second session of an interviewer interacting with the master practitioner about the first session, preparing a video segment comprising video footage from the video recording of the first session and the video recording of the second session, and providing the video segment to the participant.

In another exemplary embodiment, the video recording of the first session may include utilizing a first camera substantially directed toward the master practitioner to obtain first video footage. The video recording of the first session may further include utilizing a second camera substantially directed toward the clients to obtain second video footage. The video recording of the second session may include utilizing a third camera substantially directed toward the interviewer and the master practitioner when the interviewer and the master practitioner are watching the first session on a video playback device to obtain third video footage. The video recording of the second session may further include utilizing a fourth camera substantially directed toward the video playback device when the interviewer and the master practitioner are watching the first session on the video playback device to obtain fourth video footage. The preparing of the video segment may include editing together the first, second, and third video footage from the first, second, and third cameras to obtain the video segment, wherein an editor views the fourth video footage from the fourth camera during editing to inform the editing process. The video segment may be stored on a video medium. Alternatively, the video segment may be provided to the participant over a network such as, for example, the internet. The clients may include students and the professional environment may include a classroom. The master practitioner may include a master teacher. The interviewer may include an educational video host.

In still another exemplary embodiment of the invention, the method may include providing an assignment instruction document to the participant. The assignment instruction document may correspond to the video segment. The method may include providing a lesson plan document to the participant. The lesson plan may correspond to the first session. The method may further include providing an analysis document to the participant for use when the participant views the video segment, and providing a rubric document to the participant for guidance in preparing a written assignment about the video segment. The assignment instruction document, the lesson plan document, the analysis document, and the rubric document may be provided to the participant over a network such as, for example, the internet.

In still another exemplary embodiment of the invention, a kit for training a participant in professional practice is provided. The kit may include a video segment, the video segment comprising video footage from a first video recording of a first session of a master practitioner interacting with clients in a professional environment and a second video recording of a second session of an interviewer interacting with the master practitioner about the first session. The kit may further include an assignment instruction document corresponding to the video segment, a session outline document corresponding to the first session, an analysis document for use when the participant views the video segment, and a rubric document for guidance of the participant in preparing a written assignment about the video segment.

In another exemplary embodiment, the first video recording of the first session may include first video footage from a first camera directed toward the master practitioner and second video footage from a second camera directed toward the clients. The second video recording may include third video footage from a third camera directed toward the interviewer and the master practitioner viewing the first video recording. The video segment may be stored on a video medium. Alternatively, the video segment may be provided to the participant over a network such as, for example, the internet. The clients may include students. The professional environment may include a classroom. The master practitioner may include a master teacher.

Further features of the structure and operation of various embodiments of the invention are described in detail below with reference to the accompanying illustrative drawings.

BRIEF DESCRIPTION OF THE DRAWINGS

The foregoing and other features of the invention will be apparent from the following, more particular description of some exemplary embodiments of the invention, as illustrated in the accompanying drawings wherein like reference numbers generally indicate identical, functionally similar, and/or structurally similar elements.

FIG. 4 depicts an exemplary screen shot from a web site for accessing features of the kit of FIG. 1;

FIGS. 5A-C depict further exemplary screen shots from the web site for accessing features of the kit of FIG. 1;

FIGS. 6A-D depict an exemplary lesson plan document related to a video segment of the kit of FIG. 1;

FIGS. 7A-B depict an exemplary analysis document related to the video segment of the kit of FIG. 1;

FIG. 8 depict an exemplary assignment rubric document related to the video segment of the kit of FIG. 1;

DEFINITIONS

Figure 1:
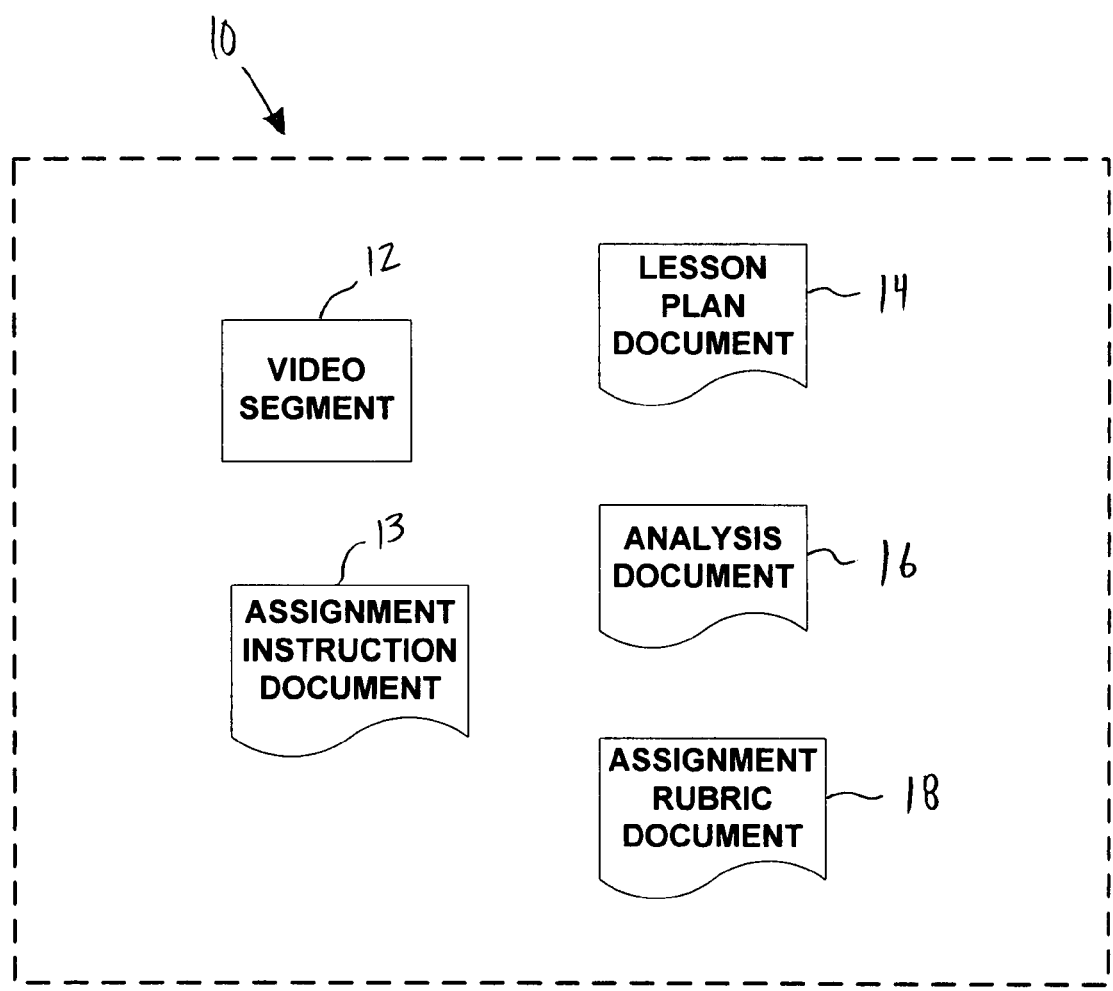
FIG. 1 depicts a virtual field experience kit according to an exemplary embodiment of the virtual training system.

In describing the exemplary embodiments of the invention, the following definitions are applicable throughout.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a personal digital assistant (PDA); a portable telephone; application-specific hardware to emulate a computer and/or software, such as, for example, a digital signal processor (DSP), a field-programmable gate array (FPGA), a chip, chips, or a chip set; an optical computer; and an apparatus that may accept data, may process data in accordance with one or more stored software programs, may generate results, and typically may include input, output, storage, arithmetic, logic, and control units.

"Software" may refer to prescribed rules to operate a computer. Examples of software may include: software; code segments; instructions; applets; pre-compiled code; compiled code; computer programs; and programmed logic.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; and a memory chip.

A "computer system" may refer to a system having one or more computers, where each computer may include a computer-readable medium embodying software to operate the computer. Examples of a computer system may include: a distributed computer system for processing information via computer systems linked by a network; two or more computer systems connected together via a network for transmitting and/or receiving information between the computer systems; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. Examples of a network may include: an internet, such as the Internet; an intranet; a local area network (LAN); a wide area network (WAN); and a combination of networks, such as an internet and an intranet.

An "interviewer" may refer to one who conducts a conversation in which facts or statements are elicited from another. An "educational video host" may refer to an interviewer knowledgeable in a given professional field such as, for example, teaching methodology.

A "master practitioner" may refer to a person of great skill and experience in a particular profession. In the context of educational training, a master practitioner may be, for example, a "master teacher" which may refer to a person skilled in educational techniques and student development. The master teacher is capable of being videotaped both in the classroom with students and afterwards in an interview with an educational video host.

"Clients" may refer to individuals receiving information from a master practitioner in a professional environment. Clients may include, for example, "students" which may refer to children (or adults) in a classroom or in other educational setting.

"Participants" may refer to people who access the virtual training system for professional development and/or educational experience.

An "assessor" may refer to an instructor or other professional who assesses participants' learning in a professional development program.

DETAILED DESCRIPTION

Exemplary embodiments of the invention are discussed in detail below. While specific exemplary embodiments are discussed, it should be understood that this is done for illustration purposes only. In describing and illustrating the exemplary embodiments, specific terminology is employed for the sake of clarity. However, the invention is not intended to be limited to the specific terminology so selected. A person skilled in the relevant art will recognize that other components and configurations may be used without parting from the spirit and scope of the invention. It is to be understood that each specific element includes all technical equivalents that operate in a similar manner to accomplish a similar purpose. The examples and embodiments described herein are non-limiting examples.

In one exemplary embodiment of the invention, a method and a kit are provided for training a participant in professional practices within a given field. Although the following discussion is directed to the employment of such methods and kits in the context of use within a teacher-training program, in particular a K-12 teacher education program, this is done for illustrative purposes only and one of ordinary skill will recognize that the methods and kits may be utilized in other professional training programs related to a variety of disciplines or areas of professional development. The exemplary method and kit may be included within a college course or other professional development program and relate to a virtual training system configured to provide field experiences to participants of such programs in a virtual manner to accelerate and enrich professional development. The system is designed to "get into the heads" of master teachers or other master practitioners in order to convey the complexities of practice (e.g., teaching) and the minute-by-minute decisions that must be made, for example, in the classroom, in order to assure learning for all students. In the educational context, the virtual training system may replicate the experiences that teachers would have if they were to visit a classroom (or multiple classrooms) in the field and observe master teachers. The system improves upon typical field experiences, however, by providing a greater diversity of students, master teachers, and school settings than typical field experiences provide. Additionally, the system provides for the playback of the field experience pinpointing competencies relevant to effective teaching.

According to the exemplary embodiment shown in FIG. 1, a virtual field experience kit 10 for training a participant may include a video segment 12, an assignment instruction document 13, a lesson plan document 14, an analysis document 16, and an assignment rubric document 18. The video segment 12 may include a video segment based on, and composed from, video footage from a video recording of a first session of a master teacher interacting with a classroom of students and a video recording of a second session of an interviewer interacting with the master teacher about the first session. For example, the video segment 12 may include a series of video segments depicting classroom teachers and students engaged in authentic instructional episodes or lessons. Each video segment 12 may include commentary provided by the classroom teacher and an interviewer such as, for example, an educational video host (EVH). The commentary may be designed to provide a "play-by-play" analysis of what transpired in the classroom in terms of theory and practice related to the art of good instruction and/or or the effective application of such theories and practices. Each video segment 12 may include a pairing of two primary elements effectively edited together: (1) video footage of the master teacher and students in the classroom, and (2) an audio and/or video recording of the master teacher and the EVH engaging in an interview or reflective dialogue such as, for example, a "play-by-play" commentary, that teases out the teacher's application of educational theory, thoughtful implementation of effective teaching practices, and rationale for complex decision-making, which may have otherwise been lost to the participant. That the "play-by-play" commentary is provided by master teacher, as opposed to some outside expert making assumptions regarding why certain decisions were made, is important. The video segment 12 may be embodied in a video storage medium (e.g., a videotape, a digital video disk (DVD), a computer-readable medium, etc.) or downloaded to a computer via a connection to a network (e.g., streamed video, downloaded file, etc.). Thus, the participants may receive the video segment 12 by the video storage medium or downloaded to a computer via a connection to a network. The video segment 12 is discussed further below with reference to FIGS. 9, 10, and 11A-B.

Figure 2:
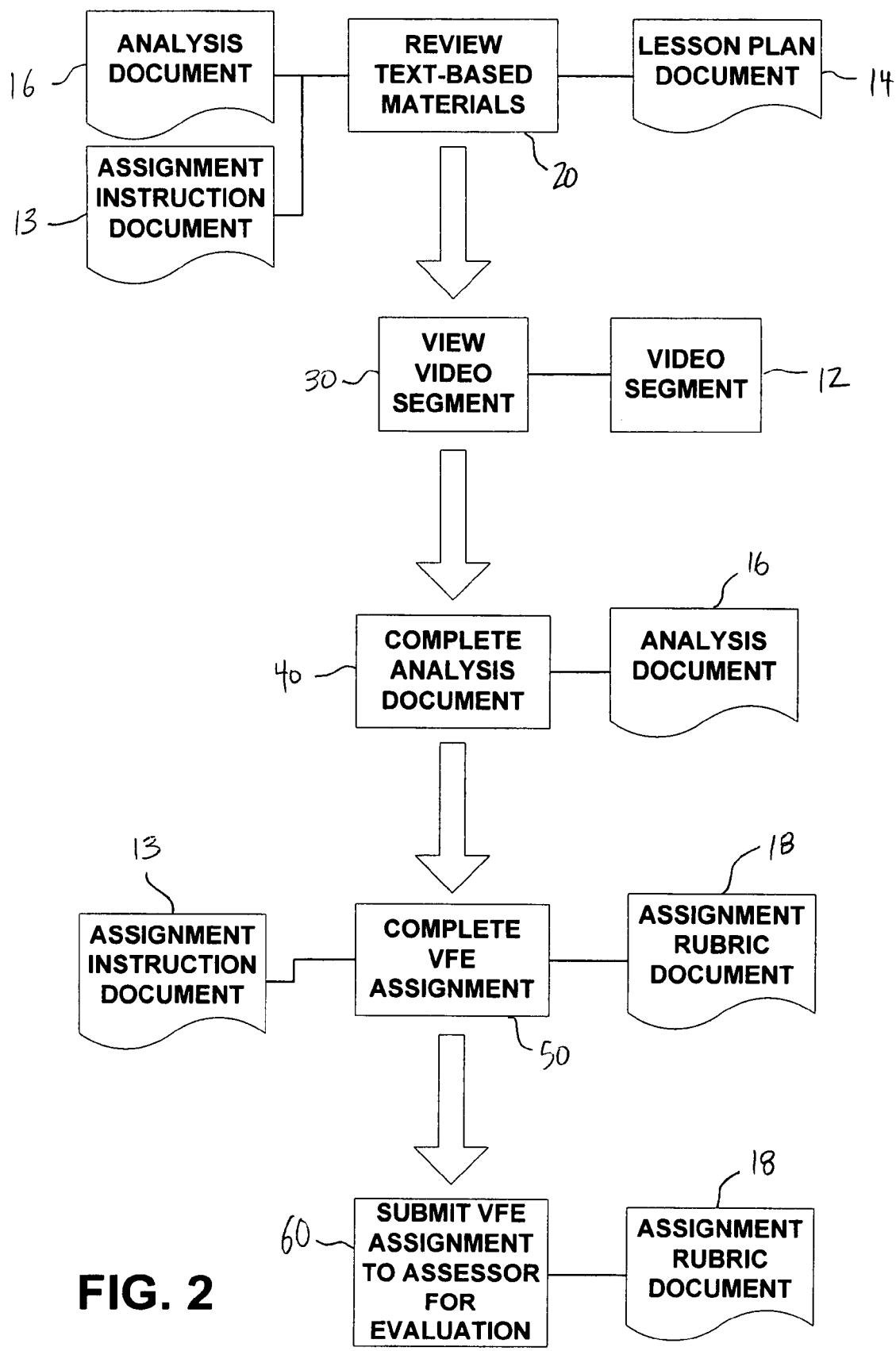
FIG. 2 illustrates an exemplary process of using the kit of FIG. 1 by a participant in a professional development program according to an exemplary embodiment of the invention.

As further depicted in FIG. 1, the kit 10 may also include text-based material such as, for example, an assignment instruction document 13, a lesson plan document 14 (including accompanying materials, student work samples, teacher-made handouts, text book excerpts etc.) configured to build context prior to viewing the video segment 12, an analysis document 16 for the participants to use during viewing of the video segment, and an assignment rubric document 18. The assignment rubric document 18 has a dual purpose. On one hand, the participant may use the assignment rubric document 18 as a guide in drafting a written assignment of the video segment. On the other hand, an assessor (e.g., a professor or instructor) may use the assignment rubric document 18 in evaluating or assessing the participant's written assignment and professional growth of the participant. As shown in FIG. 2, the participant begins a virtual field experience with kit 10 at block 20 by first reviewing the assignment instruction document 13, the lesson plan document 14, and the analysis document 16 prior to viewing the video segment 12 in order to obtain the context of the video segment 12. At block 30 the participant views the video segment 12. At block 40, the participant completes the analysis document 16 based on the viewing of the video segment 12. The analysis document 16 may be completed by participants while viewing the video segment 12 and may include, for example, a list of teaching competencies and/or practices of effective instruction known to best advance professional growth, a blank area for participants to indicate evidence of competencies and practices observed while viewing the video segment 12, and blank area for participants to provide analysis, questions and comments. At block 50, the participant completes a written assignment regarding the video segment 12 and uses the assignment instruction document 13 and the assignment rubric 18 as a guide in doing so. At block 60, the participant submits the written assignment to an assessor for evaluation. The learning by participants of the competencies and practices being taught in the video segment and text-based materials may be evaluated by an assessor using the assignment rubric 18.

Figure 3:
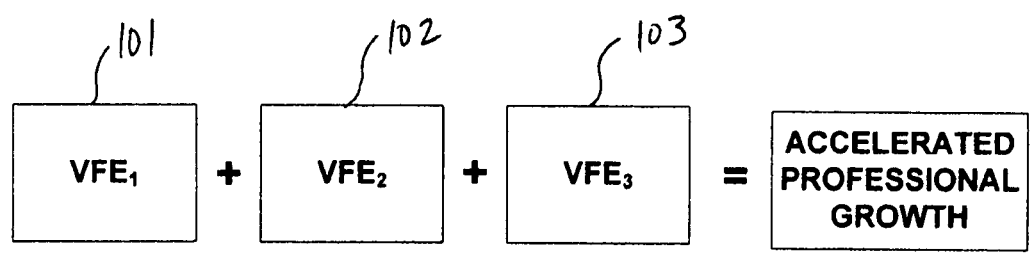
FIG. 3 illustrates the accelerated professional growth of a participant within a professional development program upon using one or more kits according to the embodiment of FIG. 1.

Exposure to multiple virtual field experience kits 101, 102, 103 (inclusive of video segments, printed materials, and assessments) in a professional development program provides participants with an opportunity to move through the developmental continuum from novice to expert at an accelerated pace and with deeper understanding (see FIG. 3). More particularly, participants who are exposed to multiple kits 10 are provided access to classrooms that cover diverse content areas (e.g., math, science, literacy, etc.), diverse students (e.g., urban, rural, suburban, etc.), diverse grade levels (e.g., preschool, elementary, middle, secondary, college, etc.), and diverse aspects of teaching (classroom management, parent involvement, testing, etc.). Thus, the professional growth of participants may be accelerated through a series of assignments using one or more kits 10. A professional development program may require participants to view and assess video segments from one or more kits to demonstrate the diversity, authenticity, and complexity of, for example, classrooms today. Video segments from one or more kits may depict and demonstrate, for example, diverse demographics of students, diverse geographical locations (e.g., urban, rural, suburban, etc.), diverse educational needs of students, and/or diverse styles of teaching. One of skill will recognize that this may be the case in any professional development program utilizing the features described herein.

As embodied in a network-based platform, participants may receive the video segment 12, text-based material 14, 16, 18, and all instructions for interacting with the video segment 12 and text-based material 14, 16, 18 via an online connection (not shown). The instructions may include, for example, instructions for completing an assignment, links to the text-based materials 14, 16, 18. FIG. 4 illustrates an exemplary screen shot of a web page 200 from a web site for accessing features of the inventive field training system such as, for example, kit 10. In particular, FIG. 4 provides an introduction to the system 201, a list of learning objectives 202, and a direction 203 to proceed to a link (e.g., on a navigation bar—not shown) to the instructions for Virtual Field Experience (VFE) assignment.

FIG. 5A is another exemplary screen shot from the web page 200 (e.g., an assignment instruction document) which includes an introduction section 204, a first instruction section 205 including instructions and links for accessing the text-based materials prior to viewing the video segment 12, a second instruction section 206 including instructions for viewing the video segment 12 and completing the text-based materials as necessary, and a third instruction section 207 including instructions for analyzing the video segment 12 and drafting a written assignment for submission to an assessor based on such analysis. A link 208 to an assignment rubric may be provided to guide the participant in drafting the written assignment. FIG. 5B is a continuation of the exemplary screen shot of FIG. 5A and includes further instructions for the completion and submission of the written assignment. Similarly, FIG. 5C is another exemplary screen shot from the web page 200 including final notes and comments 209 regarding ongoing professional development.

FIGS. 6A and 6B illustrate an exemplary lesson plan document 300 (session outline document) related to a video segment (instructional episode). In the example shown in FIGS. 6A and 6B, the lesson plan document 300 relates to a Grade 2 lesson in mathematics, specifically entitled "Mountain Math." When reviewed prior to viewing the related video segment, the lesson plan document 300 may provide background and context to the participant. FIG. 6C further illustrates the exemplary lesson plan 300 related to the video segment including a beginning (introduction), middle (methods/strategies), and end (synthesis/closure). FIG. 6D further illustrates the exemplary lesson plan 300 and includes sample student questions for the master teacher and an assessment.

FIGS. 7A and 7B illustrate an exemplary analysis document 400. As described more generally above, the analysis document 400 may be used to assure purposeful viewing of the related video segment. The analysis document 400 may include competencies and practices selected based on research regarding teacher development and best practices in specific disciplines of teaching. Further, the same competencies and practices are repeated from one virtual field experience to another and are designed to build professional vocabulary and increase knowledge acquisition and depth of understanding of the practice of teaching.

FIG. 8 illustrates an exemplary assignment rubric 500. As described more generally above, the rubric 500 may be used by both participants and assessors. A participant may use the rubric 500 as a guide when writing an assignment, which includes an analysis of the video segment. An assessor may use the rubric 500 to evaluate a participants' professional knowledge, vocabulary, ability to recognize and share insights about effective practices.

Figure 9:
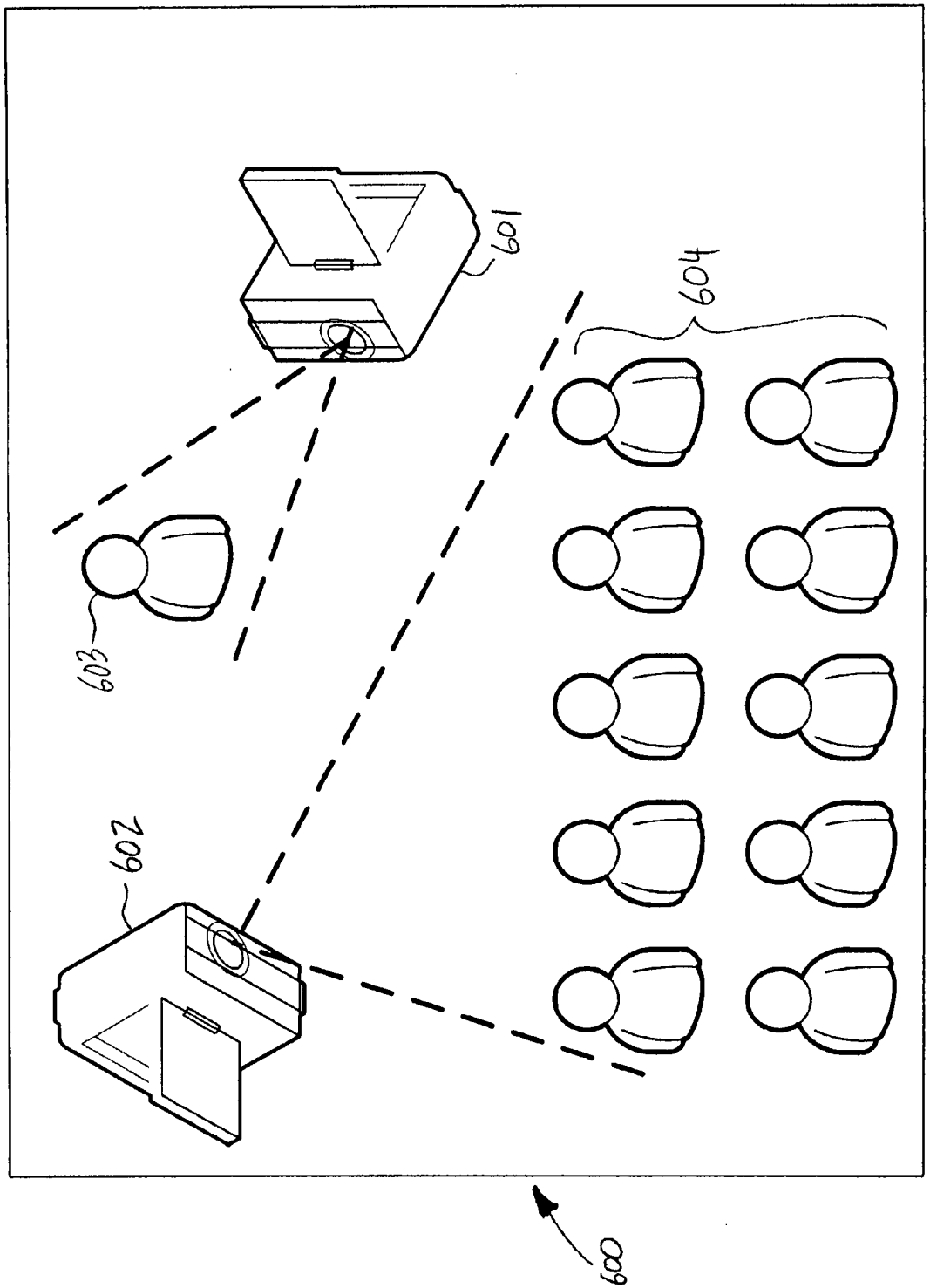
FIG. 9 depicts an exemplary classroom setting for video recording a first session of a master teacher interacting with students for use in obtaining the video segment for the kit of FIG. 1.

The video segment may be obtained from two separate video recording sessions. For the first video recording session, the interaction between a master teacher and students may be recorded using two cameras. The master teacher may be pre-screened (e.g., in a phone conversation) to determine competence and relevance of the course content. The classroom site may also be scouted to ascertain the feasibility for inclusion in a field experience video segment. Little or no preparation of students would be performed so that an authentic learning experience can be captured in the recording. As shown in FIG. 9, first and second video cameras 601, 602 may be set up in a setting 600 (e.g., a classroom) at a predetermined time of day and allowed to run without stops or retakes and obtain footage of the first recording session. The two-camera system 601, 602 shown in FIG. 9 may obtain footage of a master teacher 603 and students 604 for the first video recording session. The first camera 601 may be focused mainly on the master teacher 603. The second camera 602 may be focused mainly on the students 604. The first and second cameras 601, 602 may serve to obtain full and spontaneous coverage and capture of both the master teacher 603 and the students 604 in an authentic learning episode (first recording session—timecode #1).

An interviewer such as, for example, an educational video host (EVH) 605 (not shown in FIG. 9) may prepare for an interview with the master teacher 603. The EVH 605 may be present and positioned in the rear of the classroom 600 during the first video recording session. The EVH 605 may be viewing two monitors (one for each of the first and second cameras 601, 602) and may listen through a headset to all of the conversations between the master teacher 603 and the students 604. The EVH 605 may make notes regarding the master teacher's 603 use of the teaching competencies and practices listed on an analysis document. The EVH 605 may develop a list of questions and observations, which elicits the thinking behind the master teacher's 603 actions from notes and identifies important observations/questions with reference to timecode #1 in advance of the interview with the master teacher 603. Each question relates to an observation of the competencies and practices that would advance a participant's professional growth. The EVH 605 may not review the questions with the master teacher 603 prior to the interview.

Figure 10:
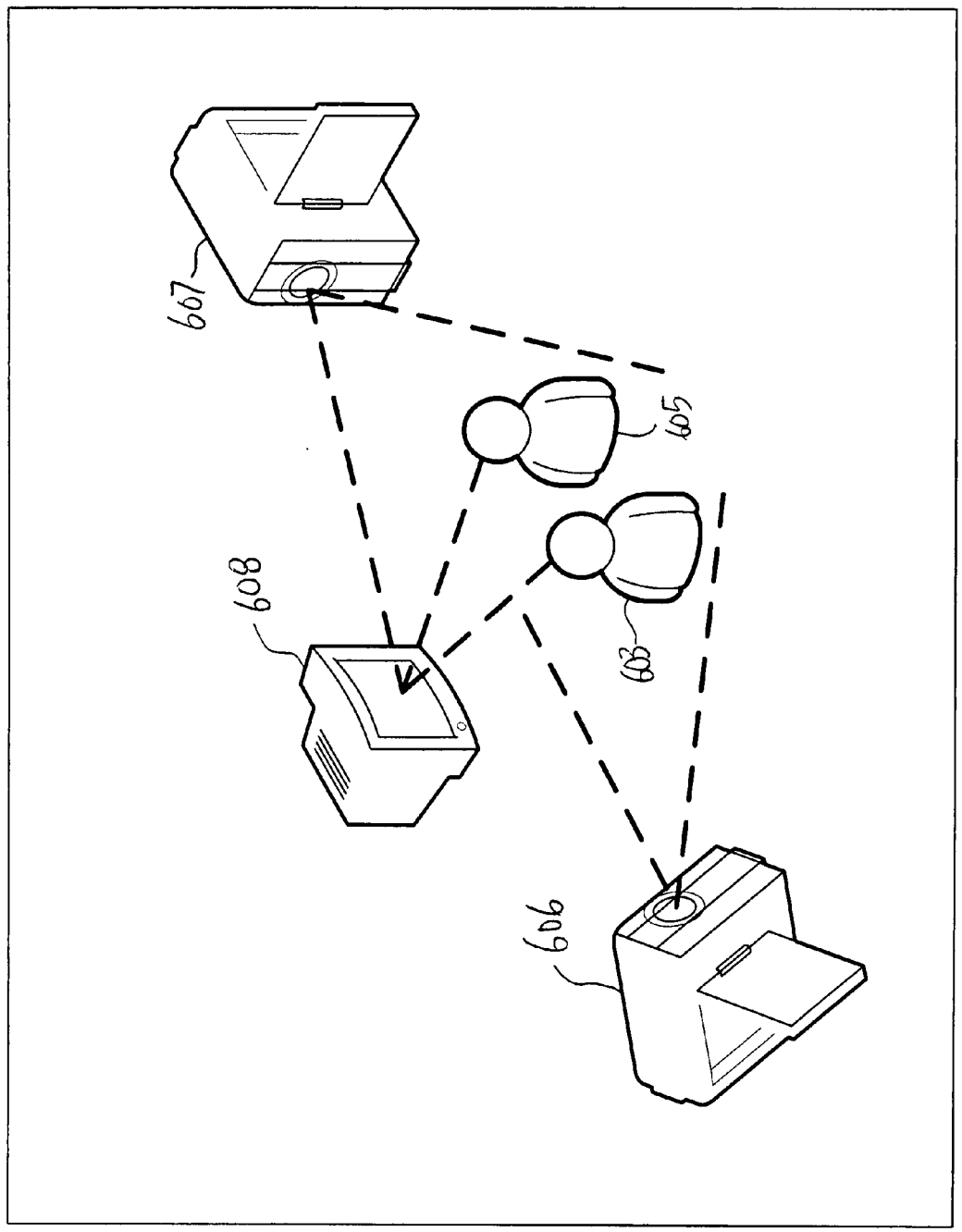
FIG. 10 depicts an exemplary setting for video recording a second session of an interviewer interacting with the master teacher according for use in obtaining the video segment for the kit of FIG. 1.

In a second video recording session depicted in FIG. 10, the interview by the EVH 605 of the master teacher 603 is recorded using third and fourth cameras 606, 607. The EVH 605 and master teacher 603 view a playback of the footage from the first video recording session on a video playback device 608. The third camera 606 may be focused mainly on, and records the interview between, the EVH 605 and the master teacher 603. The fourth camera 607 may be focused mainly on and records the video playback device 608. The fourth camera 607 may also show the EVH 605 and master teacher 603 and may include the audio channel for the second session since the fourth camera 607 is a reference for editing. The EVH 605 may use the questions/notes to question the master teacher 603, resulting in a play-by-play of the instructional episode of the first video recording session. The third and fourth cameras 606 and 607, thus, capture a reflective conversation between the interviewer 605 and the master teacher 603 to model a reflection process and/or, reflective practice and thereby allow the participant to view and analyze the professional reflective dialogue between two experienced practitioners.

The footage of the first video recording session (e.g., cameras 601, 602 in FIG. 9) includes a first time code, and the footage of the second video recording session (e.g., cameras 606, 607 in FIG. 10) includes a second time code distinct from the first time code. The first time code indicates the time in setting 600 of the first video recording session. The second time code indicates the time of the interview for the second video recording session. Both time codes appear on the footage from the fourth camera 607 for use by an editor. For example, the editor may use the video footage from the fourth camera 607 as a reference for how to construct a video segment from cams 601, 602, and 606. The editor can understand from the video footage from the fourth camera 607 how to cut together video footage from the first session (cameras 601 and 602, timecode #1) with video footage from the second session of playback conversation (camera 606, timecode #2). The video footage from the fourth camera 607 may be discarded when the video segment is complete.

Figure 11A:
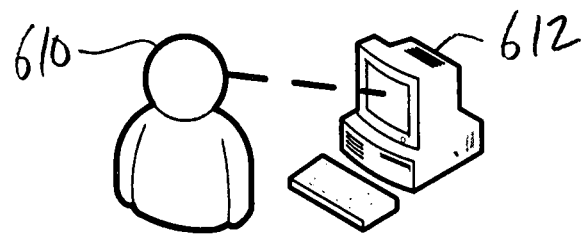
FIGS. 11A-B illustrate editing video footage from the first and second sessions of FIGS. 9 and 10 to obtain the video segment of the kit of FIG. 1 for viewing by a participant according to an exemplary embodiment of the invention.
Figure 11B:
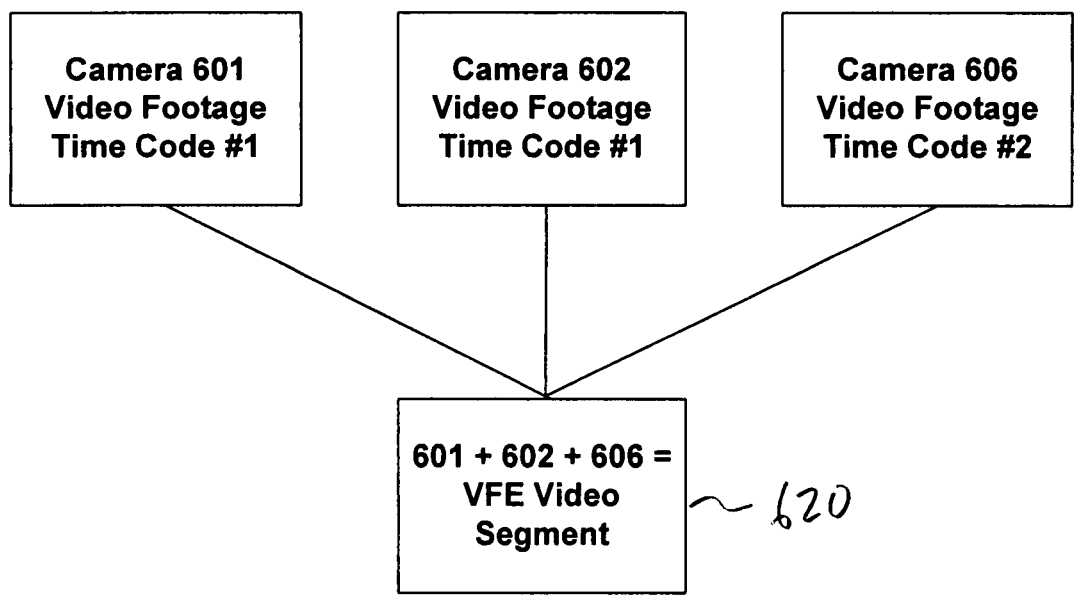

FIGS. 11A and 11B illustrate editing the video footage from the first, second, and third cameras 601, 602, and 606 to obtain the video segment 620 for viewing by the participant. As shown in FIG. 11A, an editor 610 can view video footage from the fourth camera 607 so that the editor 610 has one source displaying both time codes during the editing process. The editor may use a computer 612 or other video editing device for such viewing and for purposes of editing the video footage from the first, second, and third cameras 610, 602, 606 to obtain the video segment 620. Thus, the video segment 620 is obtained by using the video footage from the fourth camera 607 to edit together the video footage from the first and second video recording sessions. The video segment 620 may be provided on a video recording medium. Examples of a video recording medium may include: a video tape; a DVD; and a computer-readable medium. Alternatively, the video segment 620 may be obtained via downloading or streaming via a network.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method of training a participant in professional practice, comprising:
   video recording a first session of a master practitioner interacting with clients in a professional environment using at least one video camera to obtain first video footage;
   video recording a second session of an interviewer interacting with the master practitioner about the first session using at least one video camera to obtain second video footage, wherein, during the second session, the interviewer and the master practitioner are watching the first video footage from the video recording of the first session on a video playback device;
   preparing a video segment using a computer or video editing device, the video segment comprising at least a portion of the first video footage from the video recording of the first session and at least a portion of the second video footage from the video recording of the second session;
   providing the video segment to the participant on a non-transitory video storage medium or over a network for viewing by the participant;
   providing an assignment instruction document to the participant, wherein the assignment instruction document corresponds to the video segment; and
   providing a lesson plan document to the participant, wherein the lesson plan corresponds to the first session.

2. The method of claim 1, wherein the first video footage of the first session comprises video footage from a first camera of the at least one video camera for recording the first session substantially directed toward the master practitioner.

3. The method of claim 2, wherein the first video footage of the first session further comprises video footage from a second camera of the at least one video camera for recording the first session substantially directed toward the clients.

4. The method of claim 2, wherein the second video footage of the second session comprises video footage from the at least one video camera for recording the second session substantially directed toward the interviewer and the master practitioner when the interviewer and the master practitioner are watching the first video footage from the first session on the video playback device.

5. The method of claim 4, wherein the second video footage of the second session further comprises video footage from another camera of the at least one video camera for recording the second session substantially directed toward the video playback device when the interviewer and the master practitioner are watching the first video footage from the first session on the video playback device.

6. The method of claim 5, wherein the preparing of the video segment comprises:
   editing together, using the computer or the video editing device, the first and second video footage to obtain the video segment, wherein an editor views the video footage from the another camera during editing.

7. The method of claim 1, wherein the network is the Internet.

8. The method of claim 1, wherein the clients comprise students and the professional environment comprises a classroom.

9. The method of claim 1, wherein the master practitioner comprises a master teacher.

10. The method of claim 1, wherein the interviewer comprises an educational video host.

11. A method of training a participant in professional practice, comprising:
    video recording a first session of a master practitioner interacting with clients in a professional environment using at least one video camera to obtain first video footage;
    video recording a second session of an interviewer interacting with the master practitioner about the first session using at least one video camera to obtain second video footage, wherein, during the second session, the interviewer and the master practitioner are watching the first video footage from the video recording of the first session on a video playback device;
    preparing a video segment using a computer or video editing device, the video segment comprising at least a portion of the first video footage from the video recording of the first session and at least a portion of the second video footage from the video recording of the second session;

providing the video segment to the participant on a non-transitory video storage medium or over a network for viewing by the participant;

providing an assignment instruction document to the participant, wherein the assignment instruction document corresponds to the video segment;

providing a lesson plan document to the participant, wherein the lesson plan corresponds to the first session;

providing an analysis document to the participant for use when the participant views the video segment; and providing a rubric document to the participant for guidance in preparing a written assignment about the video segment.

12. The method of claim 11, wherein the assignment instruction document, the lesson plan document, the analysis document, and the rubric document are provided to the participant on a non-transitory video storage medium or over a network.

13. The method of claim 12, wherein the network is the Internet.

14. The method of claim 1, wherein the assignment instruction document and the lesson plan document are provided to the participant on a non-transitory storage medium or over a network.

15. A method of training a participant in professional practice, comprising:

video recording a first session of a master practitioner interacting with clients in a professional environment using at least one video camera to obtain first video footage;

video recording a second session of an interviewer interacting with the master practitioner about the first session using at least one video camera to obtain second video footage, wherein, during the second session, the interviewer and the master practitioner are watching the first video footage from the video recording of the first session on a video playback device;

preparing a video segment using a computer or video editing device, the video segment comprising at least a portion of the first video footage from the video recording of the first session and at least a portion of the second video footage from the video recording of the second session;

providing the video segment to the participant on a non-transitory video storage medium or over a network for viewing by the participant;

providing an assignment instruction document to the participant, wherein the assignment instruction document corresponds to the video segment; and providing an analysis document to the participant for use when the participant views the video segment.

16. The method of claim 15, wherein the assignment instruction document and the analysis document are provided to the participant on a non-transitory storage medium or over a network.

17. A method of training a participant in professional practice, comprising:

video recording a first session of a master practitioner interacting with clients in a professional environment using at least one video camera to obtain first video footage;

video recording a second session of an interviewer interacting with the master practitioner about the first session using at least one video camera to obtain second video footage, wherein, during the second session, the interviewer and the master practitioner are watching the first video footage from the video recording of the first session on a video playback device;

preparing a video segment using a computer or video editing device, the video segment comprising at least a portion of the first video footage from the video recording of the first session and at least a portion of the second video footage from the video recording of the second session;

providing the video segment to the participant on a non-transitory video storage medium or over a network for viewing by the participant;

providing an assignment instruction document to the participant, wherein the assignment instruction document corresponds to the video segment; and providing a rubric document to the participant for guidance in preparing a written assignment about the video segment.

18. The method of claim 17, wherein the assignment instruction document and the rubric document are provided to the participant on a non-transitory storage medium or over a network.

19. A method of training a participant in professional practice, comprising:

video recording a first session of a master practitioner interacting with clients in a professional environment using at least one video camera to obtain first video footage;

video recording a second session of an interviewer interacting with the master practitioner about the first session using at least one video camera to obtain second video footage, wherein, during the second session, the interviewer and the master practitioner are watching the first video footage from the video recording of the first session on a video playback device;

preparing a video segment using a computer or video editing device, the video segment comprising at least a portion of the first video footage from the video recording of the first session and at least a portion of the second video footage from the video recording of the second session;

providing the video segment to the participant on a non-transitory video storage medium or over a network for viewing by the participant;

providing an assignment instruction document to the participant, wherein the assignment instruction document corresponds to the video segment;

providing a lesson plan document to the participant, wherein the lesson plan corresponds to the first session; and providing an analysis document to the participant for use when the participant views the video segment.

20. The method of claim 19, wherein the assignment instruction document, the lesson plan document, and the analysis document are provided to the participant on a non-transitory storage medium or over a network.

21. A method of training a participant in professional practice, comprising:

video recording a first session of a master practitioner interacting with clients in a professional environment using at least one video camera to obtain first video footage;

video recording a second session of an interviewer interacting with the master practitioner about the first session using at least one video camera to obtain second video footage, wherein, during the second session, the interviewer and the master practitioner are watching the first video footage from the video recording of the first session on a video playback device;

preparing a video segment using a computer or video editing device, the video segment comprising at least a portion of the first video footage from the video recording of the first session and at least a portion of the second video footage from the video recording of the second session;

providing the video segment to the participant on a non-transitory video storage medium or over a network for viewing by the participant;

providing an assignment instruction document to the participant, wherein the assignment instruction document corresponds to the video segment;

providing a lesson plan document to the participant, wherein the lesson plan corresponds to the first session; and providing a rubric document to the participant for guidance in preparing a written assignment about the video segment.

22. The method of claim 21, wherein the assignment instruction document, the lesson plan document, and the rubric document are provided to the participant on a non-transitory storage medium or over a network.

* * * * *